March 23, 1971 TOMOO ISHIHARA 3,572,177
AUTOMATIC TRANSMISSION

Filed May 6, 1969 3 Sheets-Sheet 1

Tomoo Ishihara
Minoru Ohya
Shin Itoh
INVENTORS

BY George B. Oujevolk

ATTORNEY

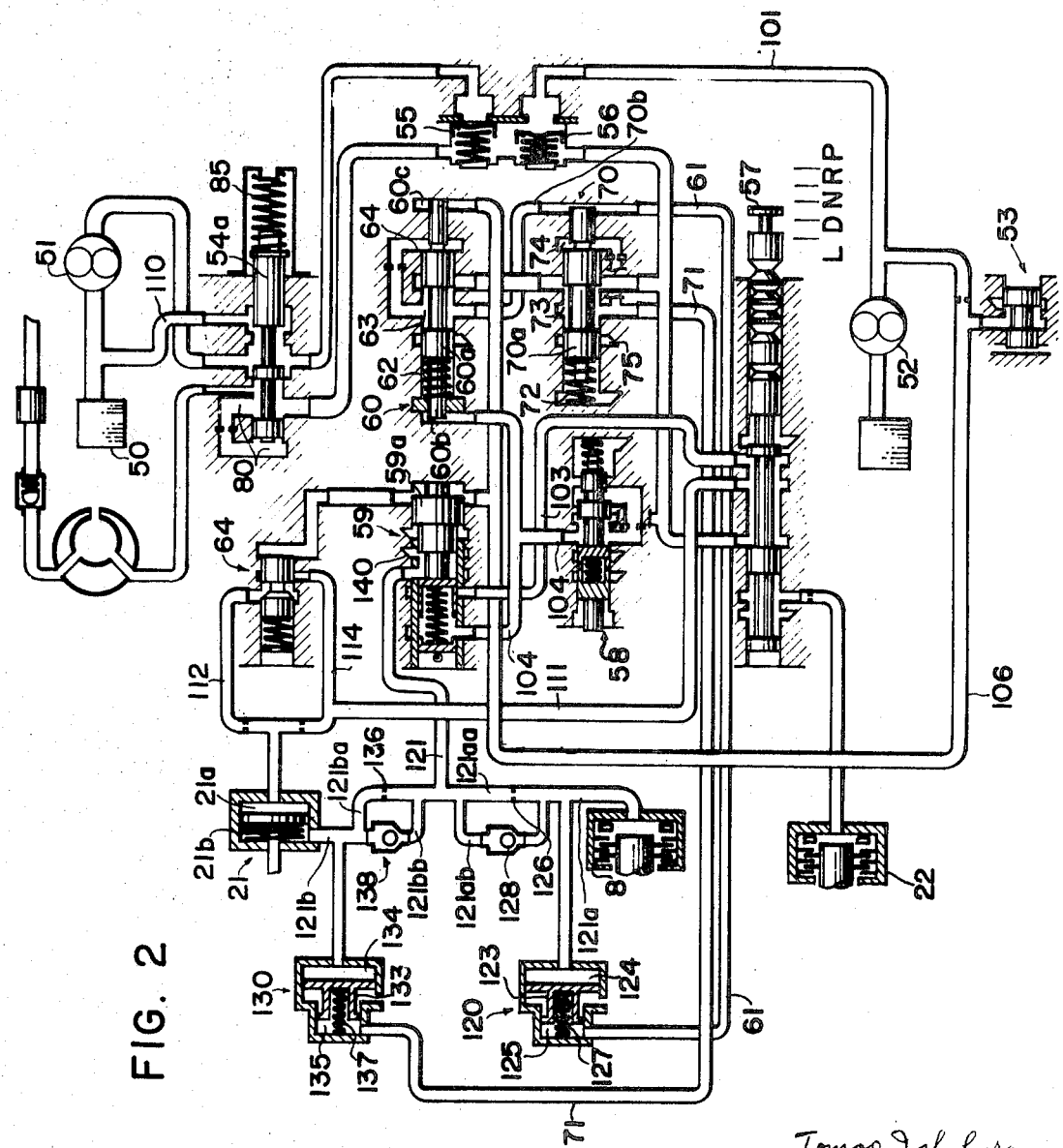

United States Patent Office 3,572,177
Patented Mar. 23, 1971

3,572,177
AUTOMATIC TRANSMISSION
Tomoo Ishihara, Tokyo, Minoru Ohya, Aichi-ken, and Shin Itoh, Tokyo, Japan, assignors to Toyota Jidosha Kogyo Kabushiki Kaisha, Toyota-shi, Aichi-ken, Japan
Filed May 6, 1969, Ser. No. 822,158
Claims priority, application Japan, June 7, 1968, 43/39,076
Int. Cl. B60k 21/06; F16d 67/04
U.S. Cl. 74—868
4 Claims

ABSTRACT OF THE DISCLOSURE

A fluid transmission wherein speed changes are carried out by a change in gearing which is accomplished by a pressure line supplying fluid pressure which acts on interlocked clutch and brake band elements. To avoid shock during the speed change, first and second accumulator arrangements are interposed in the pressure line. These accumulator arrangements include delay means whereby the release of one element is accomplished prior to the accomplishment of the engagement of the second element.

BACKGROUND OF THE INVENTION

The present invention relates to the control of pressure oil which acts upon brake band and clutch elements for speed changes in an automatic speed change gear assembly controlled by a transmission servo system, and, more particularly, to an arrangement to act on said brake band and clutch elements without causing shock.

Briefly stated, the present invention provides for an automatic transmission system having a fluid torque converter and a speed change gear assembly with hydraulic servos wherein the pressure oil for these hydraulic servos is constantly controlled so as to provide a constant pressure by a pressure regulator valve. First and second accumulator arrangements are located in the oil pressure line circuit which acts on the brake band and clutch elements of the speed change gear assembly. These accumulator arrangements will act so as to first release one element and then engage the other by fluid pressure. Appropriate pressure which varies according to the running condition of a motor vehicle is provided by this accumulator arrangement. Thus, shock, given by the vehicle when changing gear ratio for example, at the time of upshift and downshift is effectively mitigated. At the same time, the line pressure regulated by the pressure regulator valve is always kept constant irrespective of the car speed and engine throttle valve opening. Therefore, the pressure regulator valve can be relatively simple in construction making the operation certain and reliable.

The invention as well as the objects and advantages thereof will become more apparent when taken in conjunction with the accompanying drawing, in which:

BRIEF EXPLANATION OF THE DRAWINGS

FIG. 2 is a hydraulic diagram showing one embodiment of a hydraulic control circuit of an automatic transmissions related to the present invention;

EXPLANATION OF THE INVENTION

Figure 1:
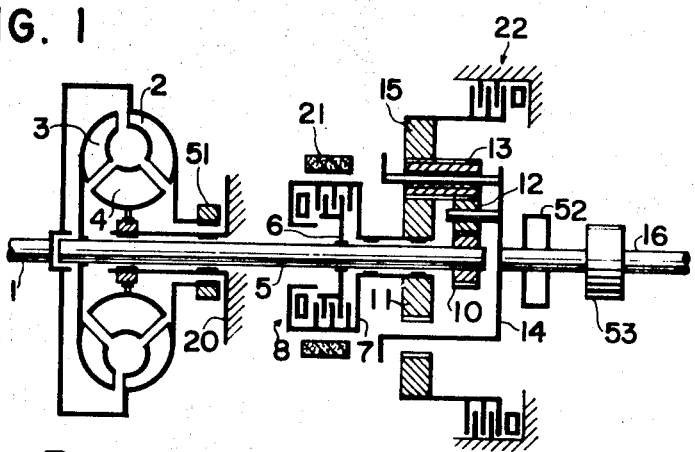
FIG. 1 is a schematic diagram of one example to which the present invention is applicable.
Figure 3:
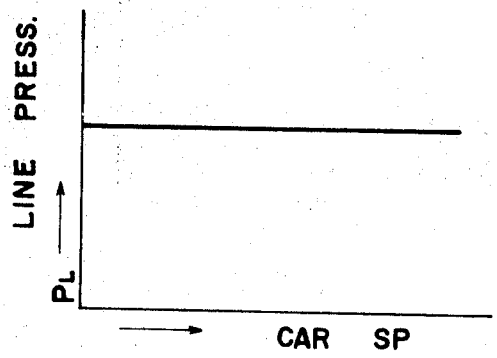
FIG. 3 is a characteristic diagram of line pressure (PL) obtainable in a pressure regulator valve according to the present invention.

This invention is applicable to a fluid automatic transmission system having a torque converter composed of a pump, a turbine, a stator etc. and a speed change gear arrangement controlled by brake bands, clutches, etc. and FIG. 1 is a schematic diagram showing one example of the automatic transmission system of forward, two-speeds and reverse, one-speed.

FIG. 1 shows a pump impeller 2 directly coupled to an engine crank shaft 1. Engine power is transmitted to a turbine vane wheel 3 by pump impeller 2 which pumps oil. The oil is conducted by a stator 4 to again enter the pump impeller 2. Thus, a torque is continuously provided to the turbine shaft 5 by the repetition of the above oil-flow cycle. The torque of the turbine so obtained is transmitted to a speed change gear arrangement provided behind the torque converter. Thus, a transmission gearing of forward, two-speeds and reverse, one-speed as well as a planetary gear unit can be accomplished by automatically controlling certain speed change elements, i.e., brake band 21 and clutch 8, brake 22, by means of the required servo hydraulic pressure.

The speed-change gear arrangement

Behind the torque converter, the turbine vane wheel 3 is connected to turbine shaft 5 to act as an input shaft for the planetary gear unit. A hub 6 of clutch 8 and an input sun gear 10 are provided on the turbine shaft. A low sun gear 11 is provided in the clutch drum and its disc 7 works with hub 6 through a multiple clutch plates disc 7 works with hub 6 through a multiple clutch plates as one body. Pinions 12, 13 mesh with each other, and are secured on a carrier 14 directly coupled with the output shaft 16 as a body. Pinions 12 and 13 also mesh with sun gear 11 and ring gear 15. There is provided a brake band element 21 on the outer periphery of the clutch drum and also a rear brake 22 is provided between the outer periphery of rear clutch and the case body. The gear change operation for forward, two-speeds and reverse, one-speed to be achieved by the above arrangement operates as follows:

Shifting from first to second speed

In the first speed, brake band element 21 is ON and clutch element 8 is OFF. By operating the front clutch element 8 to incorporate all the planetary gears to work in a body, the drive of the output shaft 16 from the turbine shaft 5 is turned into a directly coupled drive, thus the second speed is accomplished.

Reverse speed

By operating rear brake 22 to stop the rotation of ring gear 15, the rotation of turbine shaft 5, is reversed. Its speed is reduced and is transmitted to the outshaft 16, thus the reverse speed is achieved.

This automatic gear change is carried out by controlling the required clutch and brake band elements by means of the required servo pressure oil as previously explained.

However, when carrying out gear change by controlling the servo oil pressure, there is usually some accompanying shock. Therefore, various means have heretofore been devised for the purpose of reducing this shock and for this purpose, at present, the most effective way to absorb this shock is to control the oil pressure acting on the clutch and brake band elements in an appropriate and sufficient manner, but not in an exceedingly high manner according to the operating condition of the vehicle. Thus, abnormal slip of clutches, brake bands etc. is caused by an insufficient oil pressure and also excessive shock is caused by excessively high oil pressure.

The present invention provides a control means for hydraulic pressure effective for the foregoing arrangement of clutch and brake bands elements and is generally depicted in the hydraulic diagram shown in FIG. 2, illustrating an embodiment of the invention. In FIG. 2, there is a front oil pump 51 directly driven by the engine through pump impeller 2 and a rear oil pump 52 driven by the output shaft 16. Oil is pumped up from an oil sump 50 and is supplied to a pressure line 101 through check valves 55, 56. The pressure of this line 101 is regulated by a pressure regulator valve 54 and is transmitted to a throttle valve 58. Further, said line pressure is also transmitted to a line 103 by a manual valve 57 in its drive (D) range position. The opening of engine throttle valve is perceived by the above throttle valve 58 as a plug displacement, and an oil pressure proportional to said displacement must then be provided to a line 104. This oil pressure is called a throttle pressure (P$th$). On the other hand, the car speed is detected by a governor 53 driven by the output shaft 16 to be supplied to the line 106 as a governor pressure (P$go$). The change of the gear ratio for the planetary gearing is carried out by a speed shift valve 59 which is operated by the above throttle pressure (P$th$) and governor pressure (P$go$). Namely, in the drive (D) range position of manual valve 57 the line pressure is also supplied to line 111 so as to connect the manual valve 57 to the front brake band element 21. Thus, pressure is applied to the work side 21a of the servo piston of brake band 21. Now, in the case that speed shift line 121 is not pressurized, the brake band element 21 as shown in FIG. 1 is not applied and releases the front clutch element 8, thus the first speed is obtained. When attaining a car speed equivalent to the opening of the engine throttle valve, the shift valve 59 is actuated by the governor pressure (P$go$) to move leftwards to have the line 103 coupled with line 121. Then, the line pressure (PL) works on the front clutch element 8 and also on the release side 21b of servo piston, so that brake band element 21 is released and the front clutch element 8 is ON to rotate the planetary gearing as a body. Thus, the output shaft is directly coupled with the turbine shaft to establish the second speed. On the contrary, the speed change from the direct coupled drive to the reduction drive is obtained by relieving the pressure of line 121 by the shift valve 59. Also the line pressure (PL) applied to the above clutches and brake band elements, is to be regulated by the pressure regulator valve 54. However, this oil pressure regulated by the regulator valve 54 is always provided as a constant pressure irrespective of the car speed. Pressure regulator valve 54 is so designed that it is controlled by a balance between the spring force of a coil spring 85 provided on the right end of a valve spool 54a and the oil pressure of line 101 acting on a valve chamber 80 supplied from oil pumps 51 and 52. Since the force of coil spring 85 is always set at a constant pressure value, the oil pressure in valve chamber 80 in response to this is always regulated at a constant pressure in response to the force of said coil springs 85. Thus, the oil pressure regulated by this pressure regulator valve 54, is supplied to line 101, and then is supplied to the clutch and brakes.

According to the present inventive concept, when the clutches and brake bands are connected with each other to be actuated by line pressure (PL) which is continuously regulated at a constant value by pressure regulator valve 54, two accumulator units are also provided in this interlocking circuit. The servo oil pressure applied to the clutches and brake bands is appropriately changed in accordance with running conditions, such as the car speed, engine throttle valve opening and so on only during the operation of gear change. The servo oil pressure, upon operation of a shift valve, increases from zero up to the line pressure. In the meantime, the servo oil pressure remains at a pressure level lower than the line pressure for a while. This pressure level is changed in respone to the running conditions. Thus, the time taken for pressure build up is varied by the two accumulators in response to the running conditions.

Generally speaking, in the system described where there is an automatic gear-change of the clutch and brake band elements interlocked with each other so as to release one element and engage the other element, occurrence of shock at the time of speed change is caused by the action of the line pressure (PL) applied to the servo unit being unsuitable to the running conditions of the vehicle. Moreover, in the automatic gear change, there is, for instance, an upshift, to change from the first speed to the second speed, and downshift, to change from the second speed to the first speed. However, the action of the line pressure to each servo unit is different for upshift and for downshift.

Since the servo unit which acts to release at the upshift also acts to engage at the downshift, the working characteristic of line pressure must be changed depending on the time of upshift and that of downshift even for the same servo unit. In the embodiment of the invention herein described there is shown a construction which will serve to mitigate shock very favourably under the foregoing circumstances.

In brief, the objective of the present invention is achieved by the relationship between first and second accumulator valves 60, 70 taken together with first and second accumulator units 120, 130.

Accumulator valve 60 (first accumulator valve)

Accumulator valve 60, using the line pressure (PL) of line 101 as a pressure source, converts it into first accumulator pressure corresponding to the car speed and the opening of the engine throttle valve to supply pressure to line 61. Throttle pressure (P$th$) produced proportional to the opening of engine throttle valve is applied by throttle valve 58 to valve chamber 60b at the end of the left side of valve spool 60a, to act on valve spool 60a in the right direction (this force is called A).

On the left side of valve spool 60a, a coil spring 62 is provided. This spring force also acts on valve spool 60a in the right direction (this force is called B), and acts in the same manner as force A provided by the throttle pressure (P$th$). On the other hand, the governor pressure (P$go$) produced proportionally to the car speed by the governor valve 53 is supplied to the valve chamber 60c at the right side of valve spool 60a to act on valve spool 60a in the left direction (this force is called C). At the same time the line pressure (PL) of line 101 is also supplied to valve chambers 63, 64 to act on valve spool 60a in the left direction by oil pressure working on the valve means, of chamber 64 in the same manner as the governor pressure force C (this is called force D). Further, there is an exhaust port 65 to relieve the pressure in valve chamber 63 when the valve has moved leftwards.

The foregoing relationship will be better understood by looking at Table 1.

TABLE 1.—FIRST ACCUMULATOR VALVE 60

| Left side (Combining the following forces) | | Right side |
|---|---|---|
| Throttle pressure supplied by throttle valve 58 (force A). | Valve spool 60a | Governor pressure supplied by line 106 (Pgo). (force C). |
| Spring pressure supplied by spring 62 (force B) | | Line pressure supplied by line 101 (force D). |
| | Exhaust port 65 | |
| | (Output via line 61) | |

Figure 4:
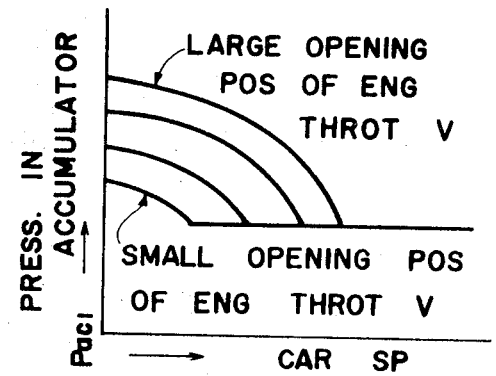
FIG. 4 is a characteristic pressure diagram of a first accumulator valves according to the present invention.

Thus, valve spool 60a of first accumulator valve 60 is moved either rightwards or leftwards by the balancing force between the rightward forces A and B, acting on the valve spool 60a and leftward forces C and D acting on the same to relieve the oil pressure of valve chamber 63 to the exhaust port 65 to control said oil pressure. In this way the control pressure of the first accumulator pressure $Pac1$ shown in FIG. 4 is produced in the line 61.

Assuming that the accelerator pedal is gradually depressed while the car is at constant speed, i.e., the opening of engine throttle valve is gradually increasing; the acting forces B and C become a constant value, so that the valve spool 60a is controlled by the acting forces A and D. Accordingly, as the acting force A of throttle pressure $Pth$ created relatively by depressing the accelerator pedal gradually increases, the acting force C must gradually increase as well, otherwise balance of the valve spool 60a can not be maintained, as a result the pressure in chambers 63, 64 will gradually rise, corresponding with the opening of the engine throttle valve. This is the reason why the oil pressure ($Pac1$ of FIG. 4) rises in proportion to the opening of the engine throttle valve in the characteristic diagram shown in FIG. 4. Next, considering the case when the car speed is increasing at the constant opening of the engine throttle valve, as the acting forces A and B are constant the valve spool 60a is controlled by the acting forces C and D. Moreover, because the forces C and D work in the same direction, these acting forces C and D are inversely proportional to each other in relation to oil pressure. That is, if with the gradual increase of the car speed the governor pressure ($Pgo$) becomes high so as to gradually increase the acting force C, the force D on the contrary gradually becomes sufficient with a smaller force.

In consequence of this, the accumulator pressure ($Pac1$) is gradually lowered according to the increase of car speed. This is illustrated by the curves dropping gradually with the increase of the car speed in the characteristic diagram of FIG. 4. Further, whatever the engine throttle valve opening may be, the constant accumulator pressure ($Pac1$) can be obtainable after the valve 60a has shut off the communication between the line 101 and the valve chamber 63 by the acting force C of the governor pressure $Pgo$. This is illustrated by the straight line in the characteristic diagram shown in FIG. 4. Furthermore, the car speed points necessary to attain the constant pressure are different depending upon the opening of the engine throttle valve. When the governor pressure $Pgo$ corresponding to the vehicle speed overcomes the resultant force of the throttle pressure $Pth$ corresponding to the throttle opening and the force of the spring 62, the spool 60a moves leftwards to thereby break off the connection of the line 101 with the valve chamber 63. Therefore constant hydraulic pressure is obtained at the low speed. With the increase of the engine throttle valve opening, the governor pressure $Pgo$ becomes accordingly higher, so that the car speed at which the hydraulic pressure becomes constant, gradually shifts to a higher speed.

Accumulator valve 70 (second accumulator valve)

This valve in a manner similar to valve 60, uses the line pressure of line 101 as a supply source, and is controlled by pressure $Pac1$ of the first accumulator created by the aforementioned valve 60. Pressure $Pac2$ from the second accumulator valve is created in line 71. A coil spring 72 is provided on the end of the left side of valve spool 70a, the force of which acts on the valve spool 70a in the right direction (this force is called E). On the other hand, the first accumulator pressure $Pac1$ created by the aforementioned accumulator valve 60 is supplied to the valve chamber 70b at the right side of valve spool 70a to act on the valve spool 70a in the left direction (this force is called F). At the same time the line pressure PL of line 101 is supplied to the valve chambers 73, 74, thus acting on the valve spool 70a in the left direction by hydraulic pressure working on the valve land of valve spool 70a in the same manner as the aforementioned force F (this force is called G). Further, 75 is an exhaust port which acts similarly to the exhaust port 65 of valve 60.

The following relationship will be better understood by looking at Table 2.

TABLE 2.—SECOND ACCUMULATOR VALVE 70

| Left side (Combining the following forces) | Right side |
|---|---|
| Coil spring 72 (force E). | First accumulator valve 60 (line 61). |
| Valve spool 70a (Force F). | |
| | Line pressure 101 (force G). |
| (Output via line 71) | |

Figure 5:
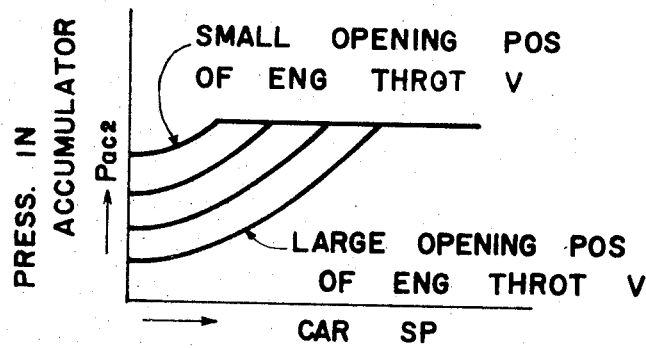
FIG. 5 is a characteristic pressure diagram of a second accumulator valve according to the present invention.

Then, the valve spool 70a of the second accumulator valve 70 moves rightwards or leftwards because of the rightwards acting force E and the leftwards acting forces F and G to control the pressure in valve chamber 73, relieving it into exhaust port 75. Thus, the control pressure $Pac2$ of the second accumulator is produced in the line 71 as shown in FIG. 5.

Since the acting force E in valve 70, which is the spring force of the coil spring, is always kept at a constant pressure, valve 70a is controlled by the acting forces F and G. Further, these acting forces F and G act in the same direction, so that with respect to oil pressure relationship, they are inverse-proportional to each other. However, since the acting force F is an accumulator pressure $Pac1$ obtained by first accumulator valve 60 shown in FIG. 4, the hydraulic pressure proportional to said accumulator pressure creates second accumulator pressure $Pac2$ in chambers 73, 74 supplied to the line 71. This second accumulator pressure $Pac2$ is controlled so as to be inversely proportional to first accumulator pressure $Pac1$, so that the characteristic pressure curve $Pac2$ is the reverse of the characteristic curve of FIG. 4. This is shown in FIG. 5.

Accumulator units 120, 130, are provided on pressure line 121 which works on the clutch element 8 and the brake band element 21 to operably interlock them so as to engage one element ond release the other.

First accumulator unit 120

The accumulator unit 120, provided on pressure line 121a leading to clutch element 8, includes a front chamber 124 and a rear chamber 125 separated by a piston 123 which is slidably fitted in a cylinder. Front chamber 124 is connected to the pressure line 121a. The rear chamber 125 contains a coil spring 127 and is connected to line 61, to which first accumulator pressure $Pac1$ created by the first accumulator valve 60 is supplied. Moreover, the front portion of line 121a for accumulator unit 120 is divided into 2 lines 121aa, 121ab, one line 121aa having an orifice 126 and the other line 121ab having a check valve 128 which allows oil flow only when releasing the clutch 8.

Second accumulator unit 130

This accumulator unit is provided on pressure line 121b and leads to the brake band element 21, in a manner similar to accumulator unit 120, and includes also a front chamber 134 and a rear chamber 135 separated by a piston 133 which is slidably fitted in a cylinder. The front chamber 134 is connected to pressure line 121b. The rear chamber 135 contains a coil spring 137, and is connected to line 71 which provides the second accumulator pressure $Pac2$ created by previously explained second accumulator valve 70. Moreover, the front portion of line 121b for accumulator unit 130 is divided into two lines 121ba, 121bb, one line 121ba having an orifice 136 and the other line 121bb having a check valve 138 which allows oil flow only when releasing brake band 21.

A better understanding of first and second accumulator units 120 and 130 may be obtained by looking at Tables 3 and 4.

TABLE 3.—FIRST ACCUMULATOR UNIT 120

Rear chamber 125:
  first accumulator valve pressure Pac1 flows through line 61 to rear chamber 125
  coil spring in rear chamber 125
  piston 123 separates front and rear chambers 124 and 125
Front chamber 124:
  feeds outlet to line 121a which acts on clutch element 8
  line 121a is divided into two lines forming a first delay unit:
    line 121aa with an outlet orifice 126
    line 121ab with a unidirectional check valve 128. The check valve allows oil flow only when releasing clutch element 8

TABLE 4.—SECOND ACCUMULATOR UNIT 130

Rear chamber 135:
  second accumulator valve pressure flows through line 71 to rear chamber 135
  coil spring in rear chamber 135
  piston 133 separates front and rear chambers 134, and 135
Front chamber 134:
  feeds outlet to line 121b which acts on brake band element 21
  line 121b is divided into two lines forming a second delay unit:
    line 121ba with an outlet orifice 136
    line 121bb with a unidirectional check valve 138. The check valve allows oil flow only when releasing brake band element 21

Upshift and downshift by means of the accumulator valves 60, 70 and the accumulator units 120, 130

Figure 6:
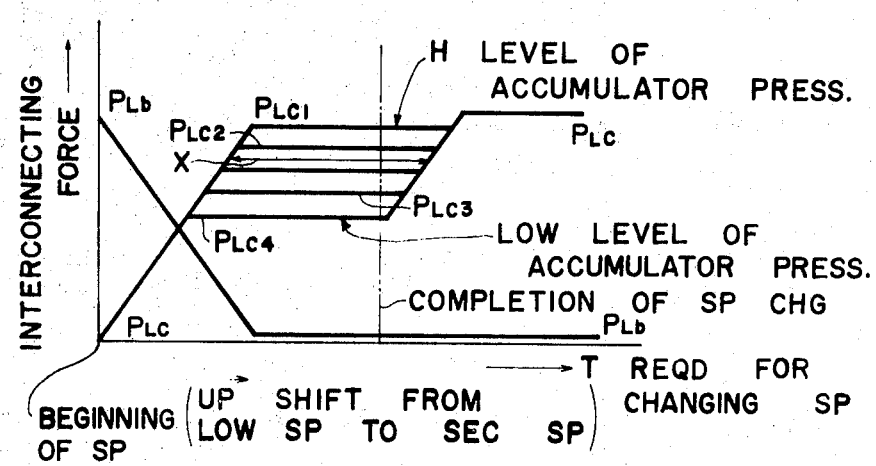
FIG. 6 is a characteristic diagram of a hydraulic servo unit at an upshift speed change.

The first speed condition in the drive range is as shown in FIG. 2 wherein the line pressure acts on the work side 21a of the servo piston of brake band element 21, thus the brake band has engaged. For automatically upshifting this first speed to the second speed, as previously described, by operation of the shift valve 59 under the required condition, line 103 and line 121 are interconnected to each other, thus the line pressure PL acts on the front clutch element 8 and also on the release side 21b of the servo piston to release the brake band element and to actuate the clutch element 8, so that upshift can be carried out. In this case, considering the operation of the line pressure of line 121 for clutch element 8, the line pressure of line 121 is supplied to clutch element 8 only through the line 121aa because of the fact that line 121ab is shut off in that direction by check valve 128. However, the hydraulic pressure to act on this clutch element 8 is modulated into the pressure corresponding to the running condition of the vehicle only at the time of gear change by first accumulator unit 120 and is applied to clutch element 8. That is, when the car speed is low and the opening of the engine throttle valve is large, the engaging power of clutch element 8 requires a comparatively large power. However, the accumulator pressure Pac created by first accumulator valve 60, as shown in FIG. 4, has a considerable high pressure, which is to enter the rear chamber 125 of the first accumulator unit 120. And, the piston 123 of accumulator 120 is to be operated by a difference of the hydraulic pressure forces acting between the front chamber 124 and the rear chamber 125. However when such high pressure Pac1 has entered the rear chamber 125 it does not move unless the line pressure PL of the front chamber 124 is also made reasonably high. Accordingly the engaging hydraulic pressure, i.e. engaging power acting on clutch in this case becomes the PLc1 line of the PLc diagrams illustrated in FIG. 6 which corresponds to the previous running condition. Next, it is preferable that according to the increase of car speed the engaging power of clutch 8 shall be comparatively weak, however, because of the hydraulic pressure being supplied to the rear chamber 125 of accumulator 120, the piston 123 of said accumulator 120 is to be operated by the line pressure supplied to the front chamber which is gradually coming down. Consequently, the engaging hydraulic pressure, i.e. engaging power acting on the clutch element 8 is also becoming weak, step by step, as PLC2, PLC3, PLC4 in accordance with the decrease of accumulator pressure Pac1 by the increase of car speed as shown in FIG. 6, thus satisfying the foregoing condition. Furthermore, the width of X shown in FIG. 6 is an operating range of piston 123, which is determined by the volume of accumulator unit 120. On the other hand, considering when the line pressure PL of line 121 acts on the release side 21b of servo piston of brake band, the line pressure PL of said line 121 passes through 2 lines, one line 121ba having the orifice 136 and the other line 121bb having the check valve 138, and is supplied to the release side 21b of the brake band. Particularly, because of the absence of an orifice in line 121bb, the line pressure PL suddenly supplies a large quantity of oil to the release side of 21b upon changing-over the shift valve 59. Thus, because a large quantity of oil is suddenly supplied and since the accumulator unit 130 corresponding with the running condition of explained, the engaging power of the brake band, as shown by PLb line in FIG. 6, suddenly falls down to release the brake band. That is, the piston of this brake band is operated by a difference between the force acting on the work side 21a and that acting on the release side 21b, and in the present case a release-directional acting force is suddenly produced on the release side 21b thus the above operation is carried out. Further, the release action of this brake band, as well understood by FIG. 6, finishes earlier than the accomplishment of the engaging action of clutch 8.

Figure 7:
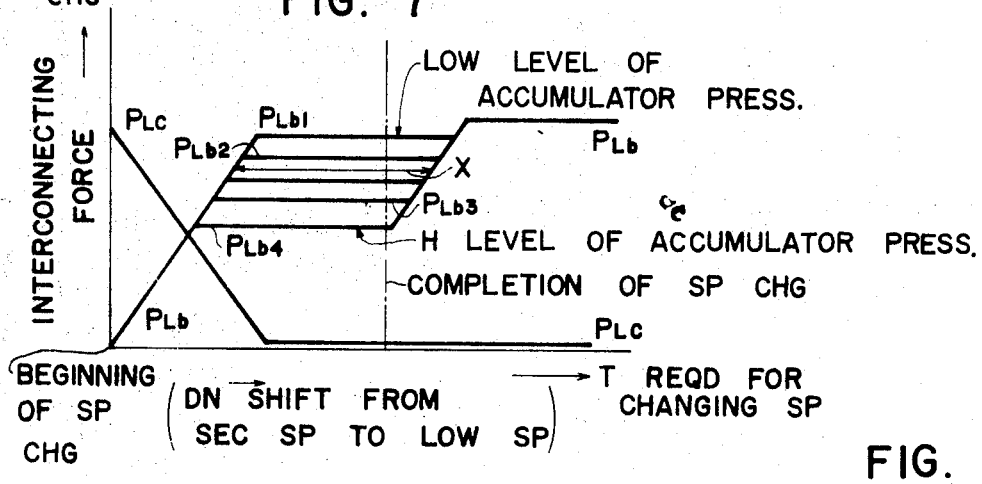
FIG. 7 is a characteristic diagram of a hydraulic servo unit at a downshift speed change.

Down shift is obtained by discharging the hydraulic pressure of line 121 to the exhaust port 140 by the shift valve 59. First considering the engaging action of the brake band at the time of down shift, since the check valve 138 of line 121bb shuts off the oil flow in this direction, the hydraulic pressure at the piston release side 21b is relieved only through line 121ba having orifice 136. However, in this case, the engaging action of the brake band is carried out by second accumulator unit 130 corresponding with the running condition of the vehicle. That is, when the car speed is low and the engine throttle valve opening is large, a comparatively large engaging power is required from the accumulator pressure Pac2 created by the second accumulator unit 130 corresponding with the running condition. However, the accumulator pressure Pac2 provided by the second accumulator valve 70 in this case, as shown in FIG. 5, is the comparatively low pressure, which exists in the rear chamber 135 of accumulator 130. In the front chamber 134 of this accumulator 130 a comparatively high pressure exists before gear change and the piston has been moved to the left direction thereby. Under such conditions, said piston 133 does not move unless the hydraulic pressure in the front chamber 134 comes down considerably, so that the pressure at the release side 21b of the brake band element is held low, and said brake band element is given a high engaging power by the hydraulic pressure of work side 21a usually acting thereon. The change of engaging power of the brake band element in this condition is shown by PLb1 line of P1b diagram in FIG. 7, which is clearly corresponding to the above running condition.

With an increase in car speed it is preferable that the engaging power of the brake band element shall be comparatively weak, as shown in FIG. 5. The accumulator pressure Pac2 gradually becomes high pressure according to the increase of the car speed, and this pressure is to be supplied to the rear chamber 135 of accumulator unit 130, therefore, the piston 133 of said accumulator 130 moves when the line pressure PL in the front chamber 134 is comparatively high. Accordingly, the engaging power of the brake band element gradually grows weaker as PL$b$2, PL$b$3, PL$b$4, etc. in accordance with the increase of the accumulator pressure P$ac$2, thus satisfying the necessary conditon. The release operation of clutch element 8, occurs since check valve 128 of line 121$ab$ allows the oil to flow to the release acting direction of the clutch, which exhausting the oil pressure acting on clutch element 8. Thus, a large quantity of oil is suddenly discharged through two lines 121$ab$ and 121$aa$. Therefore, the accumulator unit 130 does not work as previously described, so that the engaging power of clutch element 8 suddenly falls down (as the PL$c$ line shown in FIG. 7), thus releasing clutch element 8. Further, such clutch release action finishes earlier than the accomplishment of the brake band engaging action as is clear from FIG. 7.

Figure 9:
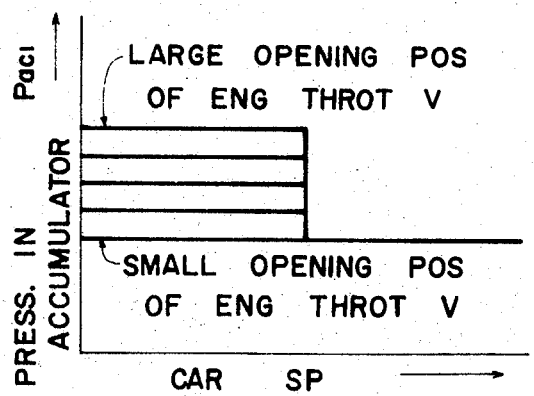
Figure 8:
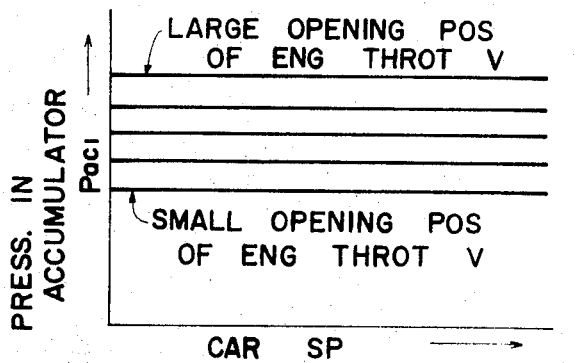
FIG. 8 shows another characteristic diagram of accumulator pressure obtainable with the first accumulator of the present invention; and, FIG. 9 is still another characteristic diagram of accumulator pressure with the first accumulator of the present invention.

FIG. 8 and FIG. 9 show diagrams of another possible accumulator pressure P$ac$1 contemplated to accomplish the objectives of this invention and to obtain desired characteristics of the accumulator pressure P$ac$1.

It is to be observed therefore that the present invention provides for a fluid transmission wherein speed changes are carried out by a change in gearing. This change in gearing is accomplished by a fluid pressure circuits which includes a shift valve 59 controlling fluid pressure supplied over a speed shift line 121 to first and second interlocked speed change elements 8 and 21, the shift valve 59 causes one element to engage and the other to release.

According to the present inventive concept, first and second accumulators arrangements, 60, 70, 120, 130 are in said pressure circuit. These accumulator arrangements have pressure delay means 121$aa$, 121$ab$, 121$ba$, 121$bb$ so that the releasing of one element is accomplished prior to the accomplishment of the engagement of the second element.

The respective speed change elements are a brake band element and a clutch element. These are so connected to the gearing that when in the first speed, the brake element 21 is ON and the clutch element 8 is OFF. In the second speed, the clutch element 8 is ON and the brake element is OFF. The first and second accumulator arrangements includes first and second accumulator valves 60 and 70 and first and second accumulators 120 and 130 respectively coupled to each other; and, the pressure delay means are first and second delay lines 121$a$, 121$b$, interposed between the speed shift line 121, said first and second accumulators 120, 130, and said speed change elements 8 and 121. These delay lines operate on a formed cycle and a reverse cycle. Also each delay line has a parallel circuit with a narrow orifice side and a unidirectional side. However, the unidirectional sides are both unidirectional in the flow direction so as to permit a faster flow of pressure to the one element than to the other element so that the one element can release before the other element will engage.

What is claimed is:

1. In a fluid transmission wherein speed changes are carried out by a change in gearing, said change in gearing being in turn accomplished by a fluid pressure circuit, extending through a shift valve (59) controlling fluid pressure supplied over a speed shift line (121) onto first and second interlocked brake and clutch band speed change elements (8, 21) by releasing the one element and engaging the other element, the improvement therein wherein said fluid pressure circuit extending through said shift valve (59) branches into two separate circuits, one circuit being to engage one element, while the other circuit is for disengaging the other element, first and second accumulator arrangements respectively interposed in said one and the other circuit so that the releasing of the one element is accomplished prior to the accomplishment of the engagement of the second element.

2. In a fluid transmission wherein speed changes are carried out by a change in gearing, said change in gearing being in turn accomplished by a fluid pressure circuit, including a shift valve (59) controlling fluid pressure supplied over a speed shift line (121) onto first and second interlocked servo brake and clutch band speed change elements (21, 8) by releasing the one element and engaging the other element, wherein first and second accumulator arrangements are interposed in said pressure delay means so that the releasing of the one element is accomplished priort to the acomplishment of the engagement of the second element, the improvement therein wherein there is further provided:

(a) a first accumulator valve (70); a first accumulator (130) responsive to said second accumulator valve (70) said band element (21) being coupled to said first accumulator (130);

(b) a second accumulator valve (60), a second accumulator (120) coupled to said second accumulator valve, said clutch element (8) being coupled to and responsive to said second accumulator (120); and, (c) said pressure delay means being first and second delay lines (121$a$, 121$b$) interposed between said speed shift line (121), said first and second accumulators, and said speed change elements, said first and second delay lines each having a first pressure feed cycle in one direction and a second pressure feed cycle in the other direction, said first and second delay lines including check means to slow down the pressure feed cycle with respect to one of said elements so that said one element cannot accomplish engagement until the other element disengages.

3. In a transmission system as claimed in claim 2 including:

(a) a fluid pressure line (101) supplying fluid pressure;

(b) a governor pressure line (106) supplying pressure corresponding to velocity;

(c) a throttle pressure line (103) supplying throttle pressure;

(d) said first accumulator valve (60) including a valve spool (60$a$) dividing said valve into two sides, spring means (62) biasing said valve spool on the one side in one direction (B), said throttle pressure line (103) being connected to said one side also supplying force in said one direction (A), said fluid pressure line (101) and said governor pressure line (106) being connected to the other side supplying pressure in the other direction (C, D). An exhaust port (65) and an output line (61) the position of said valve spool (60$a$) receiving said opposing combined forces (A, B, C, D) determining the output of said output line;

(e) said second accumulator valve (70) likewise having a valve spool (70$a$) dividing said valve into two sides, spring means (72) biasing said valve from one side in one direction (E), said fluid pressure line (101) and said first accumulator output line (61) being connected to the other side acting on said valve spool in the other direction (F, G,), and exhaust port (75) and an output line (71), the position of said valve spool (70$a$) receiving said forces (E, F, G) determining the output of said second accumulator output line (71); and, said first and second accumulator output lines (61, 71) respectively connect to said first and second accumulators.

4. In a transmission system as claimed in claim 3 wherein said first and second accumulators each includes front and rear chambers (124, 125; 134, 135) separated by a piston (123, 133) said rear chambers containing a spring biasing said piston and being connected to said first and second accumulator output lines (61, 71), said front chambers being coupled to said first and second delay lines, said delay lines each having a parallel delay circuit comprising a narrow orifice side and a unidirectional side, both unidirectional sides being unidirectional in the flow direction so as to permit a faster flow of pressure to one element than to the other element thus, the one element can release before the other element will accomplish engagement.

References Cited
UNITED STATES PATENTS

| | | | |
|---|---|---|---|
| 2,876,656 | 3/1959 | Herndon | 74—869X |
| 3,077,122 | 2/1963 | Olsen | 74—869X |
| 3,096,667 | 7/1963 | Dickeson et al. | 74—869X |
| 3,099,172 | 7/1963 | Jania et al. | 74—869X |
| 3,159,051 | 12/1964 | Herndon et al. | 74—869X |
| 3,233,478 | 2/1966 | General et al. | 74—761 |
| 3,401,581 | 9/1968 | Chana | 74—868X |

CARLTON R. CROYLE, Primary Examiner

T. C. PERRY, Assistant Examiner

U.S. Cl. X.R.

192—12, 109